(12) United States Patent
Podaima et al.

(10) Patent No.: US 9,747,213 B2
(45) Date of Patent: Aug. 29, 2017

(54) PROVIDING MEMORY MANAGEMENT UNIT (MMU) PARTITIONED TRANSLATION CACHES, AND RELATED APPARATUSES, METHODS, AND COMPUTER-READABLE MEDIA

(71) Applicant: QUALCOMM Incorporated, San Diego, CA (US)

(72) Inventors: Jason Edward Podaima, Markham (CA); Bohuslav Rychlik, San Diego, CA (US); Carlos Javier Moreira, Markham (CA); Serag Monier GadelRab, Markham (CA); Paul Christopher John Wiercienski, Toronto (CA); Alexander Miretsky, Vaughan (CA); Kyle John Ernewein, Toronto (CA)

(73) Assignee: QUALCOMM Incorporated, San Diego, CA (US)

( * ) Notice: Subject to any disclaimer, the term of this patent is extended or adjusted under 35 U.S.C. 154(b) by 51 days.

(21) Appl. No.: 14/725,882

(22) Filed: May 29, 2015

(65) Prior Publication Data
US 2016/0350222 A1 Dec. 1, 2016

(51) Int. Cl.
*G06F 12/12* (2016.01)
*G06F 12/0846* (2016.01)
(Continued)

(52) U.S. Cl.
CPC ........ *G06F 12/0848* (2013.01); *G06F 12/109* (2013.01); *G06F 12/1036* (2013.01);
(Continued)

(58) Field of Classification Search
CPC ........... G06F 12/0848; G06F 2212/282; G06F 12/1016; G06F 12/1028; G06F 12/601;
(Continued)

(56) References Cited

U.S. PATENT DOCUMENTS 5,430,857 A 7/1995 Kendall
5,652,872 A * 7/1997 Richter ............... G06F 11/3648
703/26

(Continued)

OTHER PUBLICATIONS

International Search Report and Written Opinion for PCT/US2016/030040, mailed Sep. 5, 2016, 10 pages.

*Primary Examiner* — Reginald Bragdon
*Assistant Examiner* — Aaron D Ho
(74) *Attorney, Agent, or Firm* — W&T/Qualcomm

(57) ABSTRACT

Providing memory management unit (MMU) partitioned translation caches, and related apparatuses, methods, and computer-readable media. In this regard, an apparatus comprising an MMU is provided. The MMU comprises a translation cache providing a plurality of translation cache entries defining address translation mappings. The MMU further comprises a partition descriptor table providing a plurality of partition descriptors defining a corresponding plurality of partitions each comprising one or more translation cache entries of the plurality of translation cache entries. The MMU also comprises a partition translation circuit configured to receive a memory access request from a requestor. The partition translation circuit is further configured to determine a translation cache partition identifier (TCPID) of the memory access request, identify one or more partitions of the plurality of partitions based on the TCPID, and perform the memory access request on a translation cache entry of the one or more partitions.

33 Claims, 9 Drawing Sheets

(51) Int. Cl.
*G06F 12/1036* (2016.01)
*G06F 12/109* (2016.01)

(52) U.S. Cl.
CPC ............... *G06F 2212/1016* (2013.01); *G06F 2212/1028* (2013.01); *G06F 2212/282* (2013.01); *G06F 2212/50* (2013.01); *G06F 2212/601* (2013.01); *G06F 2212/68* (2013.01); *G06F 2212/69* (2013.01)

(58) Field of Classification Search
CPC .. G06F 12/12; G06F 2212/50; G06F 2212/68; G06F 2212/69
USPC ........................................................ 711/129
See application file for complete search history.

(56) References Cited

U.S. PATENT DOCUMENTS

| | | | |
|---|---|---|---|
| 6,230,248 B1* | 5/2001 | Burger | G06F 12/1036 711/156 |
| 6,493,800 B1* | 12/2002 | Blumrich | G06F 12/084 711/129 |
| 8,146,087 B2 | 3/2012 | Chiang et al. | |
| 8,301,865 B2 | 10/2012 | Grohoski et al. | |
| 8,683,175 B2 | 3/2014 | Ekanadham et al. | |
| 2010/0100648 A1 | 4/2010 | Madukkarumukumana et al. | |
| 2011/0145542 A1* | 6/2011 | Morrow | G06F 12/1027 711/207 |
| 2012/0110298 A1 | 5/2012 | Matsuse | |
| 2012/0117301 A1 | 5/2012 | Wingard | |
| 2013/0007407 A1 | 1/2013 | Gupta et al. | |
| 2015/0301939 A1* | 10/2015 | Bybell | G06F 12/1027 711/207 |

* cited by examiner

PROVIDING MEMORY MANAGEMENT UNIT (MMU) PARTITIONED TRANSLATION CACHES, AND RELATED APPARATUSES, METHODS, AND COMPUTER-READABLE MEDIA

BACKGROUND

I. Field of the Disclosure

The technology of the disclosure relates generally to translation caches provided by memory management units (MMUs).

II. Background

Virtual memory is a memory management technique provided by most modern computing systems. Using virtual memory, a central processing unit (CPU) or a peripheral device of the computing system may access a memory buffer using a virtual memory address mapped to a physical memory address within a physical memory space. In this manner, the CPU or peripheral device may be able to address a larger physical address space than would otherwise be possible, and/or may utilize a contiguous view of a memory buffer that is, in fact, physically discontiguous across the physical memory space.

Virtual memory is conventionally implemented through the use of a memory management unit (MMU) for translation of virtual memory addresses to physical memory addresses. The MMU may be integrated into the CPU of the computing system (a CPU MMU), or may comprise a separate circuit providing memory management functions for peripheral devices (a system MMU, or SMMU). In conventional operation, the MMU receives memory access requests from "upstream" devices, such as direct memory access (DMA) agents, video accelerators, and/or display engines, as non-limiting examples. For each memory access request, the MMU translates the virtual memory addresses included in the memory access request to a physical memory address, and the memory access request is then processed using the translated physical memory address.

Because an MMU may be required to translate a same virtual memory address repeatedly within a short time interval, performance of the MMU and the computing system overall may be improved by caching address translation data within the MMU. In this regard, the MMU may include a structure known as a translation cache (also referred to as a translation lookaside buffer, or TLB). The translation cache provides translation cache entries in which previously generated virtual-to-physical memory address translation mappings may be stored for later access. If the MMU subsequently receives a request to translate a virtual memory address stored in the translation cache, the MMU may retrieve the corresponding physical memory address from the translation cache rather than retranslating the virtual memory address.

However, the performance benefits achieved through use of the translation cache may be lost in scenarios in which the MMU provides address translation services for multiple upstream devices. Because the upstream devices must share the resources of the MMU's translation cache, competition for the limited number of translation cache entries may result in "thrashing," in which two or more upstream devices repeatedly evict each other's translation cache entries in favor of their own. In a worst-case scenario, the additional overhead resulting from thrashing may cancel out the benefits of caching. A larger translation cache may mitigate the effects of inter-device competition for translation cache entries, but may also result in increased power consumption and a larger physical footprint.

SUMMARY OF THE DISCLOSURE

Aspects disclosed in the detailed description include providing memory management unit (MMU) partitioned translation caches, and related apparatuses, methods, and computer-readable media. In this regard, an MMU is provided for enabling translation cache partitioning. The MMU includes a translation cache that provides translation cache entries, each of which stores a virtual-to-physical address mapping determined by a previous address translation operation. To enable partitioning, the MMU provides a partition descriptor table, and, optionally, a partition remapping table and/or a partition selection table. The partition descriptor table includes partition descriptors that each define a partition containing one or more translation cache entries of the translation cache. Upon receiving a memory access request from a requestor, a partition translation circuit of the MMU determines a translation cache partition identifier (TCPID) of the memory access request, and identifies one or more of the partitions based on the TCPID. In some aspects, determining the TCPID may include using the partition remapping table to locate the TCPID of the memory access request as an input TCPID associated with an output TCPID. The output TCPID, in turn, may then be used to identify the one or more partitions using the partition selection table. Once the one or more partitions are identified, a cache operation (e.g., a cache search operation and/or a cache eviction operation) is performed on a translation cache entry of the one or more translation cache entries of the one or more partitions. In this manner, the translation cache of the MMU may be effectively partitioned among multiple requestors, resulting in reduced competition between requestors for translation cache entries.

In one aspect, an apparatus is provided, comprising an MMU for providing partitioned translation caches. The MMU comprises a translation cache configured to provide a plurality of translation cache entries each defining an address translation mapping. The MMU further comprises a partition descriptor table configured to provide a plurality of partition descriptors defining a corresponding plurality of partitions of the translation cache, each partition of the plurality of partitions comprising one or more translation cache entries of the plurality of translation cache entries. The MMU also comprises a partition translation circuit. The partition translation circuit is configured to receive a memory access request from a requestor. The partition translation circuit is further configured to determine a translation cache partition identifier (TCPID) of the memory access request. The partition translation circuit is also configured to identify one or more partitions of the plurality of partitions based on the TCPID. The partition translation circuit is additionally configured to perform a cache operation on a translation cache entry of the one or more translation cache entries of the one or more partitions.

In another aspect, an MMU is provided. The MMU comprises a means for providing a plurality of translation cache entries each defining an address translation mapping. The MMU further comprises a means for providing a plurality of partition descriptors defining a corresponding plurality of partitions of a translation cache of the MMU, each partition of the plurality of partitions comprising one or more translation cache entries of the plurality of translation cache entries. The MMU also comprises a means for receiving a memory access request from a requestor. The MMU additionally comprises a means for determining a TCPID of the memory access request. The MMU further comprises a means for identifying one or more partitions of the plurality of partitions based on the TCPID. The MMU also comprises a means for performing a cache operation on a translation cache entry of the one or more translation cache entries of the one or more partitions.

In another aspect, a method for providing partitioned translation caches is provided. The method comprises receiving, by an MMU, a memory access request from a requestor. The method further comprises determining a TCPID of the memory access request. The method also comprises identifying, based on the TCPID, one or more partitions of a plurality of partitions of a translation cache of the MMU. The method additionally comprises performing a cache operation on a translation cache entry of one or more translation cache entries of the one or more partitions.

In another aspect, a non-transitory computer-readable medium is provided, having stored thereon computer-executable instructions. When executed by a processor, the computer-executable instructions cause the processor to receive a memory access request from a requestor. The computer-executable instructions further cause the processor to determine a TCPID of the memory access request. The computer-executable instructions also cause the processor to identify, based on the TCPID, one or more partitions of a plurality of partitions of a translation cache of an MMU. The computer-executable instructions additionally cause the processor to perform a cache operation on a translation cache entry of one or more translation cache entries of the one or more partitions.

DETAILED DESCRIPTION

Figure 1:
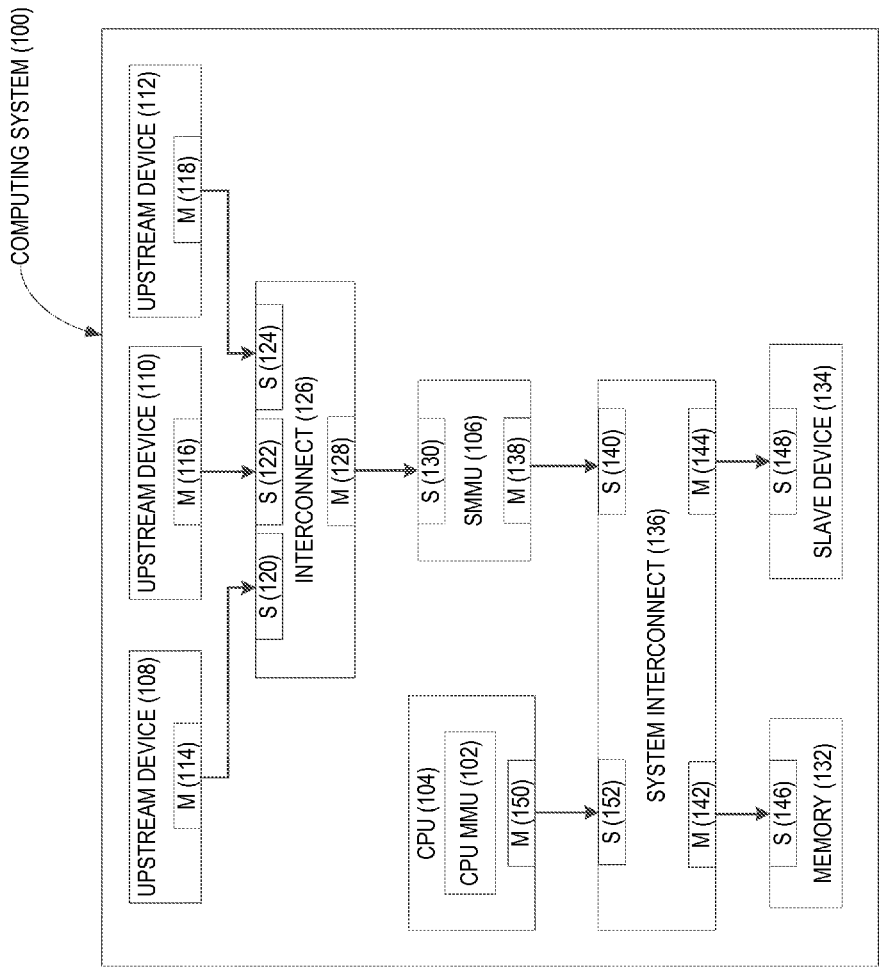
FIG. 1 is a block diagram illustrating an exemplary computing system illustrating communications flows from upstream devices to a memory management unit (MMU) providing address translation services.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Before discussing exemplary apparatuses and methods for providing MMU partitioned translation caches as disclosed herein, a conventional computing system providing virtual-to-physical memory address translation is described. In this regard, FIG. 1 is a block diagram illustrating an exemplary computing system 100 in which a central processing unit (CPU) MMU 102 provides address translation services for a CPU 104, and a system MMU (SMMU) 106 provides address translation services for upstream devices 108, 110, and 112. It is to be understood that the computing system 100 and the elements thereof may encompass any one of known digital logic elements, semiconductor circuits, processing cores, and/or memory structures, among other elements, or combinations thereof. Aspects described herein are not restricted to any particular arrangement of elements, and the disclosed techniques may be easily extended to various structures and layouts on semiconductor dies or packages.

As seen in FIG. 1, the computing system 100 includes the upstream devices 108, 110, and 112 having master ports (M) 114, 116, and 118, respectively, that are connected to corresponding slave ports (S) 120, 122, and 124 of an interconnect 126. In some aspects, each of the upstream devices 108, 110, and 112 may comprise a peripheral device such as a direct memory access (DMA) agent, a video accelerator, and/or a display engine, as non-limiting examples. The interconnect 126 may receive memory access requests (not shown) from the upstream devices 108, 110, and 112, and may transfer the memory access requests from a master port (M) 128 to a slave port (S) 130 of the SMMU 106. After receiving each memory access request, the SMMU 106 may perform virtual-to-physical memory address translation, and, based on the address translation, may access a memory 132 and/or a slave device 134 via a system interconnect 136. As shown in FIG. 1, a master port (M) 138 of the SMMU 106 communicates with a slave port (S) 140 of the system interconnect 136. The system interconnect 136, in turn, communicates via master ports (M) 142 and 144 with slave ports (S) 146 and 148, respectively, of the memory 132 and the slave device 134. In some aspects, the memory 132 and/or the slave device 134 may comprise a system memory, system registers, and/or memory-mapped input/output (I/O) devices, as non-limiting examples. It is to be understood that, while the SMMU 106 serves the upstream devices 108, 110, and 112, some aspects may provide that the SMMU 106 may serve more or fewer upstream devices than illustrated in FIG. 1.

As noted above, the computing system 100 also includes the CPU 104 having integrated therein the CPU MMU 102. The CPU MMU 102 may provide address translation services for CPU memory access requests (not shown) of the CPU MMU 102 in much the same manner that the SMMU 106 provides address translation services to the upstream devices 108, 110, and 112. After performing virtual-to-physical memory address translation of a CPU memory access request, the CPU MMU 102 may access the memory 132 and/or the slave device 134 via the system interconnect 136. In particular, a master port (M) 150 of the CPU 104 communicates with a slave port (S) 152 of the system interconnect 136. The system interconnect 136 then communicates via the master ports (M) 142 and 144 with the slave ports (S) 146 and 148, respectively, of the memory 132 and the slave device 134.

To improve performance, an MMU, such as the CPU MMU 102 and/or the SMMU 106, may provide a translation cache (not shown) for storing previously generated virtual-to-physical memory address translation mappings. However, in the case of an MMU that is shared among multiple upstream devices, such as the SMMU 106, the upstream devices may be forced to compete for the limited resources of the translation cache. This may result in thrashing, as the upstream devices repeatedly evict each other's translation cache entries in favor of their own. In a worst-case scenario, the extra overhead incurred by thrashing may cancel out the benefits of the translation cache.

Figure 2:
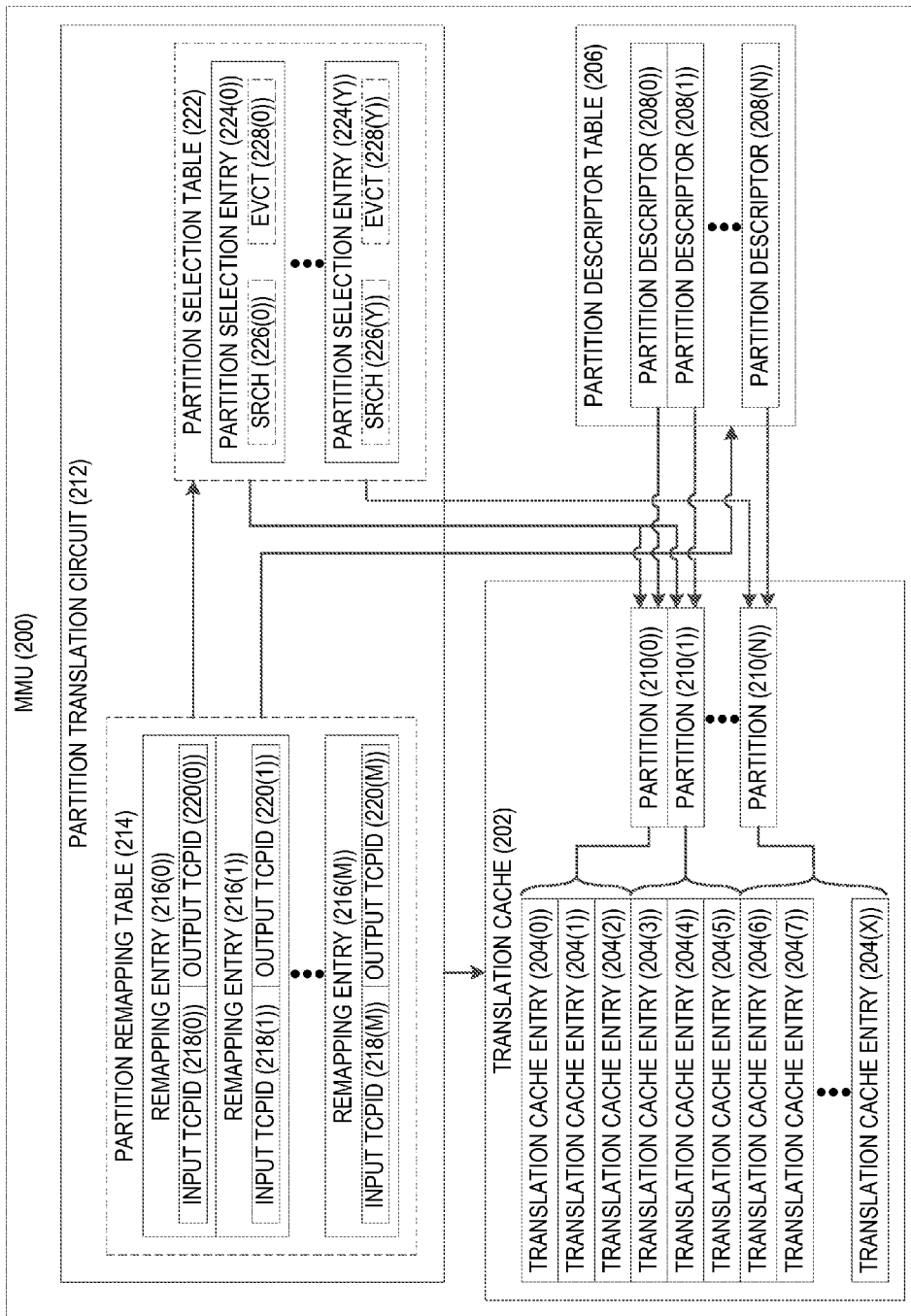
FIG. 2 is a block diagram illustrating an exemplary MMU for providing a partitioned translation cache.

In this regard, FIG. 2 is provided to illustrate an exemplary MMU 200 for providing a partitioned translation cache. In some aspects, the MMU 200 may be employed in a computing system, such as the computing system 100 of FIG. 1, in place of the CPU MMU 102 and/or the SMMU 106. The MMU 200 includes a translation cache 202 providing translation cache entries 204(0)-204(X). In some aspects, each of the translation cache entries 204(0)-204(X) defines an address translation mapping (not shown), such as a virtual-to-physical memory address translation mapping, as a non-limiting example. It is to be understood that some aspects may provide that the translation cache 202 may include more or fewer translation cache entries 204(0)-204(X) than illustrated in FIG. 2. The translation cache 202 is also referred to herein as "a means for providing a plurality of translation cache entries each defining an address translation mapping."

The MMU 200 further includes a partition descriptor table 206. The partition descriptor table 206 provides partition descriptors 208(0)-208(N), which define corresponding partitions 210(0)-210(N). As shown in FIG. 2, each of the partitions 210(0)-210(N) includes one or more of the translation cache entries 204(0)-204(X) of the translation cache 202. For instance, in the example of FIG. 2, the partition 210(0) includes translation cache entries 204(0)-204(2), while the partition 210(1) includes translation cache entries 204(3)-204(5) and the partition 210(N) includes translation cache entries 204(6)-204(X). According to some aspects, the partition descriptor table 206 may include more or fewer partition descriptors 208(0)-208(N) than illustrated in FIG. 2. The partition descriptor table 206 is also referred to herein as "a means for providing a plurality of partition descriptors defining a corresponding plurality of partitions of a translation cache of the MMU." Exemplary mechanisms that may be used by the partition descriptors 208(0)-208(N) to define the corresponding partitions 210(0)-210(N) are discussed below in greater detail with respect to FIGS. 3A and 3B.

In some aspects, the partitions 210(0)-210(N) may be regarded as logical constructs defined by the partition descriptors 208(0)-208(N). Some aspects may provide that the partition descriptors 208(0)-208(N) may be configured at design time. Accordingly, in such aspects, the number of the partitions 210(0)-210(N) and the number of the translation cache entries 204(0)-204(X) allocated to each of the partitions 210(0)-210(N) may be determined at design time. In some aspects, the partition descriptors 208(0)-208(N) may be programmable by software at run time, thus permitting the number of the partitions 210(0)-210(N) and the number of the translation cache entries 204(0)-204(X) for each of the partitions 210(0)-210(N) to be dynamically configured.

With continuing reference to FIG. 2, the MMU 200 also includes a partition translation circuit 212. In exemplary operation, the partition translation circuit 212 receives a memory access request (not shown) from a requestor, such as one of the upstream devices 108, 110, 112 of FIG. 1. The partition translation circuit 212 may then determine a TCPID (not shown) of the memory access request. As discussed in greater detail below with respect to FIG. 4, the TCPID may be expressly provided by the requestor as part of the memory access request, and/or may be derived by the partition translation circuit 212 based on the source type and/or attributes of the memory access request itself. The partition translation circuit 212 then identifies one or more of the partitions 210(0)-210(N) based on the TCPID, and performs a cache operation on one or more of the translation cache entries 204(0)-204(X) corresponding to the identified one or more of the partitions 210(0)-210(N). In some aspects, performing a cache operation may comprise searching the translation cache entries 204(0)-204(X), writing to one or more of the translation cache entries 204(0)-204(X), and/or evicting contents of one or more of the translation cache entries 204(0)-204(X), as non-limiting examples. The partition translation circuit 212 may be referred to herein as "a means for receiving a memory access request from a requestor," "a means for determining a TCPID of the memory access request," "a means for identifying one or more partitions of the plurality of partitions based on the TCPID," and/or "a means for performing a cache operation on a translation cache entry."

The partition translation circuit 212 thus may ensure that, in response to the memory access request from the requestor, the partition translation circuit 212 performs a cache operation only on the particular translation cache entries 204(0)-204(X) that are associated with the one or more of the partitions 210(0)-210(N) identified by the TCPID. For example, if the TCPID identifies the partition 210(0), the partition translation circuit 212 may be able to perform a cache operation only on the translation cache entries 204(0)-204(2) associated with the partition 210(0). In effect, the partition translation circuit 212 may use the partitions 210(0)-210(N) to provide an access control mechanism to the translation cache entries 204(0)-204(X), preventing requestors associated with different TCPIDs from negatively affecting each other's translation cache entries 204(0)-204(X).

In some aspects, circumstances may arise under which it may be desirable to map the TCPID received within or derived from the memory access request to an "output" TCPID that is actually used to identify one or more of the partitions 210(0)-210(N). For example, providing TCPID remapping may facilitate software reconfiguration of the partition descriptors 208(0)-208(N). In this regard, in some aspects the partition translation circuit 212 may optionally provide a partition remapping table 214 containing one or more remapping entries 216(0)-216(M). The remapping entries 216(0)-216(M) each map a corresponding input TCPID 218(0)-218(M) (i.e., a TCPID that identifies a translation cache partition or set of partitions that an upstream requestor specifies to use for address translation) to a corresponding output TCPID 220(0)-220(M) (i.e., a TCPID that identifies a translation cache partition or set of partitions actually used for address translation). The partition translation circuit 212 may thus perform TCPID remapping after determining the TCPID received from or derived from the memory access request.

To do so, the partition translation circuit 212 first identifies one of the remapping entries 216(0)-216(M) in which the input TCPID 218(0)-218(M) corresponds to the TCPID of the memory access request. In some aspects, the TCPID of the memory access request may be software programmable, or may be hard-coded such that software cannot modify the values of the TCPID of the memory access request. The partition translation circuit 212 may then retrieve the output TCPID 220(0)-220(M) from the remapping entry 216(0)-216(M) containing the input TCPID 218(0)-218(M), and may use the output TCPID 220(0)-220(M) to identify one or more of the partitions 210(0)-210(N) as the target of the cache operation. In this manner, the partition remapping table 214 may enable programmatic remapping of the TCPID received as part of the memory access request, which may allow software performance optimization, system performance tuning, and/or correction of hardware issues resulting from incorrect requestor-specified TCPIDs, as non-limiting examples.

According to some aspects, the MMU 200 may also optionally provide a partition selection table 222 to facilitate selection of the translation cache entries 204(0)-204(X) that are active and eligible for cache searching and/or cache eviction. To this end, the partition selection table 222 includes partition selection entries 224(0)-224(Y) corresponding to the partitions 210(0)-210(N). Each of the partition selection entries 224(0)-224(Y) may correspond to one or more of the partitions 210(0)-210(N). In the example of FIG. 2, for instance, the partition selection entry 224(0) corresponds to the partitions 210(0) and 210(1), while the partition selection entry 224(Y) corresponds to the partition 210(N). In some aspects, the partition selection entries 224(0)-224(Y) may be selected using one of the output TCPID 220(0)-220(M) retrieved from the partition remapping table 214. Each of the partition selection entries 224(0)-224(Y) may include one or both of a search control indicator (SRCH) 226(0)-226(Y) and an eviction control indicator (EVCT) 228(0)-228(Y). In some aspects, the search control indicators 226(0)-226(Y) and/or the eviction control indicators 228(0)-228(Y) may comprise bit indicators, flags, and/or other state indicators as known in the art.

The partition translation circuit 212 may be configured to identify one or more of the partitions 210(0)-210(N) as targets for a cache operation based on a corresponding partition selection entry 224(0)-224(Y) for the one or more partitions 210(0)-210(N). For example, before performing a cache search operation on the partitions 210(0) and 210(1), the partition translation circuit 212 may first determine whether the partitions 210(0) and 210(1) are eligible for searching based on the search control indicator 226(0) of the partition selection entry 224(0) corresponding to the partitions 210(0) and 210(1). Similarly, the partition translation circuit 212 may determine whether the partitions 210(0) and 210(1) are eligible for eviction based on the eviction control indicator 228(0) of the partition selection entry 224(0) corresponding to the partitions 210(0) and 210(1).

Figure 3A:
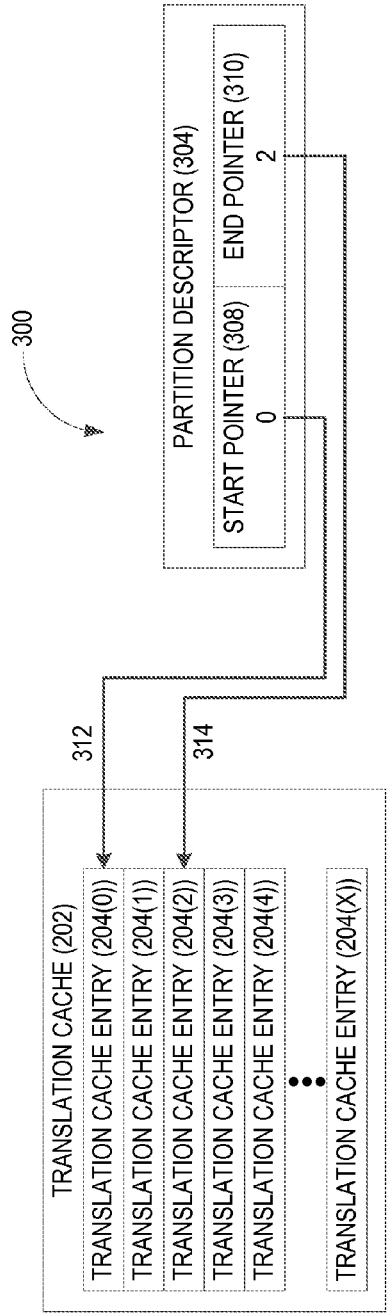
FIGS. 3A and 3B are block diagrams illustrating exemplary aspects of a partition descriptor illustrated in FIG. 2 for defining a translation cache partition.
Figure 3B:
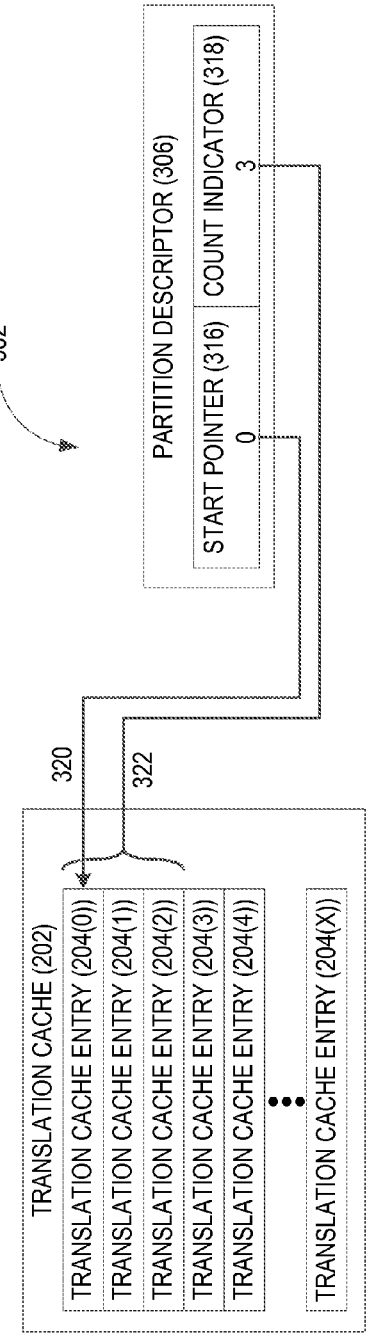

As noted above, the partition descriptors 208(0)-208(N) of the partition descriptor table 206 may be provided to define corresponding partitions 210(0)-210(N) of the translation cache 202. FIGS. 3A and 3B are block diagrams 300 and 302, respectively, showing two exemplary partition descriptors illustrating different mechanisms for defining a partition such as the partition 210(0) of FIG. 2 (not shown). In FIGS. 3A and 3B, the translation cache 202 of FIG. 2 provides the translation cache entries 204(0)-204(X), as discussed above. FIGS. 3A and 3B also provide partition descriptors 304 and 306, respectively, each defining the partition 210(0) including the translation cache entries 204(0)-204(2) of FIG. 2. Thus, the partition descriptors 304 and 306 may thus correspond in functionality to the partition descriptor 208(0) of FIG. 2.

In FIG. 3A, the partition descriptor 304 defines the partition 210(0) using a start pointer 308 and an end pointer 310. The start pointer 308 indicates a starting translation cache entry 204(0) for the partition 210(0), as shown by arrow 312. Similarly, the end pointer 310 indicates an ending translation cache entry 204(2) for the partition 210(0), as shown by arrow 314.

The partition descriptor 306 of FIG. 3B illustrates an alternate partition definition mechanism. In FIG. 3B, the partition descriptor 306 provides a start pointer 316 and a count indicator 318. The start pointer 316 indicates the starting translation cache entry 204(0) for the partition 210(0), as shown by arrow 320. The count indicator 318 provides a value ("3") indicating a count of the translation cache entries 204(0)-204(2) contained in the partition 210(0), as indicated by arrow 322.

Figure 4:
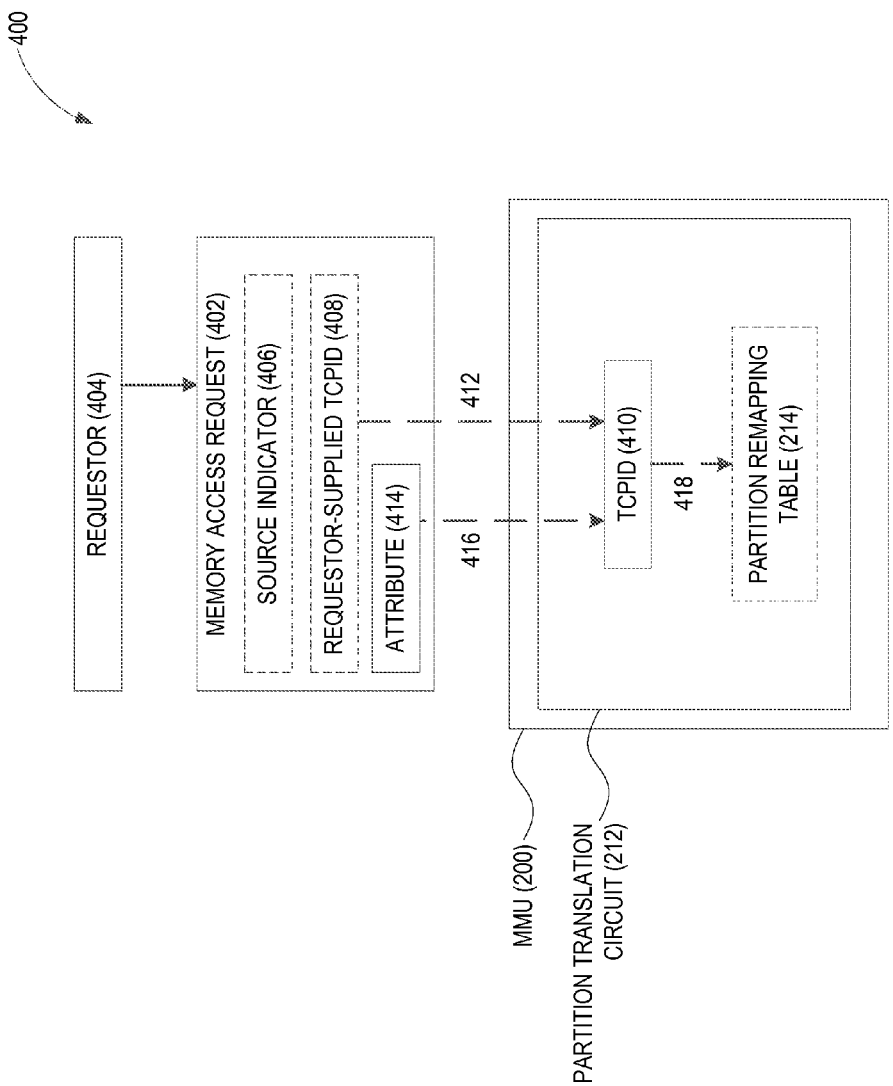
FIG. 4 is a block diagram illustrating exemplary aspects of a memory access request and a partition translation circuit illustrated in FIG. 2 for determining a translation cache partition identifier (TCPID)

FIG. 4 provides a diagram 400 to illustrate exemplary aspects of the memory access request and the partition translation circuit 212 of the MMU 200 of FIG. 2 for determining a TCPID. In FIG. 4, the partition translation circuit 212 receives a memory access request 402 from a requestor 404. In some aspects, the requestor 404 may comprise one of the upstream devices 108, 110, 112 of FIG. 1. Some aspects may provide that the MMU 200 is a second-stage MMU, and the requestor 404 is a first-stage MMU. As seen in FIG. 4, the memory access request may include a source indicator 406 that is indicative of a source type of the requestor 404. As a non-limiting example, the source indicator 406 may be a flag indicating whether the requestor 404 is one of the upstream devices 108, 110, 112 of FIG. 1, or whether the requestor 404 is a first-stage MMU. The partition translation circuit 212 may then derive the TCPID based on the source indicator 406. This may allow the partition translation circuit 212 to allocate a portion of the translation cache 202 for exclusive use by the first-stage MMU, as a non-limiting example.

The memory access request 402 may also include an optional requestor-supplied TCPID 408 provided by the requestor 404. When the requestor-supplied TCPID 408 is received as part of the memory access request 402, the partition translation circuit 212 may retrieve the requestor-supplied TCPID 408, and use it as a TCPID 410 for identifying one or more of the partitions 210(0)-210(N) of FIG. 2 as a target for a cache operation, as indicated by arrow 412. Some aspects may provide that, in addition to or instead of using the requestor-supplied TCPID 408 as the TCPID 410, the partition translation circuit 212 may derive the TCPID 410 based on an attribute 414 of the memory access request 402, as shown by arrow 416. As non-limiting examples, the TCPID 410 may be determined based on one or more attributes 414 such as a master identifier (ID) attribute that uniquely identifies the requestor 404, a read/write attribute, a secure/non-secure attribute, a memory type attribute, a cacheability attribute, and/or a shareable attribute of the memory access request 402. In some aspects, the partition translation circuit 212 may optionally remap the TCPID 410 using the partition remapping table 214, as shown by arrow 418.

Figure 5:
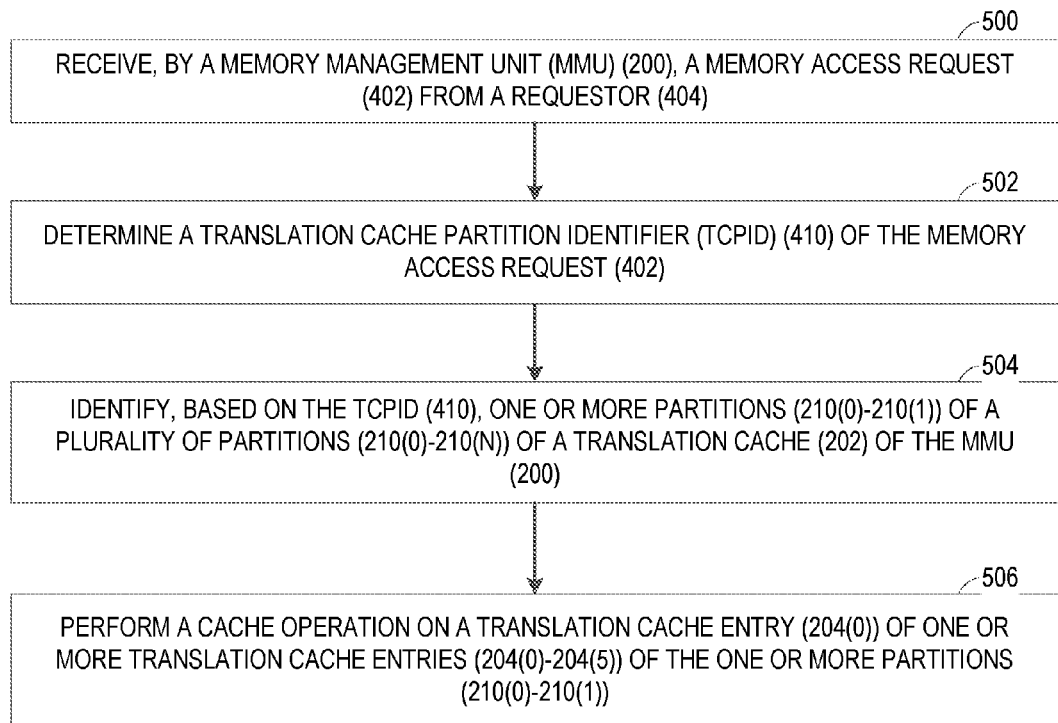
FIG. 5 is a flowchart illustrating exemplary operations of the MMU of FIG. 2 for providing partitioned translation caches.

To illustrate exemplary operations of the MMU 200 of FIG. 2 for providing partitioned translation caches, FIG. 5 is provided. For the sake of brevity, elements of FIGS. 2 and 4 are referenced in describing FIG. 5. In FIG. 5, operations begin with the MMU 200 (in particular, the partition translation circuit 212) receiving the memory access request 402 from the requestor 404 (block 500). In some aspects, the requestor 404 may comprise a first-stage MMU, or may comprise an upstream device such as the upstream devices 108, 110, 112 of FIG. 1.

The partition translation circuit 212 determines a TCPID 410 of the memory access request 402 (block 502). The partition translation circuit 212 next identifies one or more partitions, such as the partitions 210(0)-210(1), of the plurality of partitions 210(0)-210(N) of the translation cache 202 of the MMU 200 based on the TCPID 410 (block 504). The partition translation circuit 212 then performs a cache operation on a translation cache entry, such as the translation cache entry 204(0), of the one or more translation cache entries 204(0)-204(5) of the one or more partitions 210(0)-

210(1) (block 506). Some aspects may provide that performing the cache operation may comprise searching the translation cache entries 204(0)-204(5), writing to one or more of the translation cache entries 204(0)-204(5), and/or evicting contents of one or more of the translation cache entries 204(0)-204(5), as non-limiting examples. It is to be understood that the selection of the translation cache entries 204(0)-204(5) in this example are non-limiting examples, and that other or additional translation cache entries 204(0)-204(X) may be selected based on the partitions 210(0)-210(N) identified by the TCPID 410.

Figure 6A:
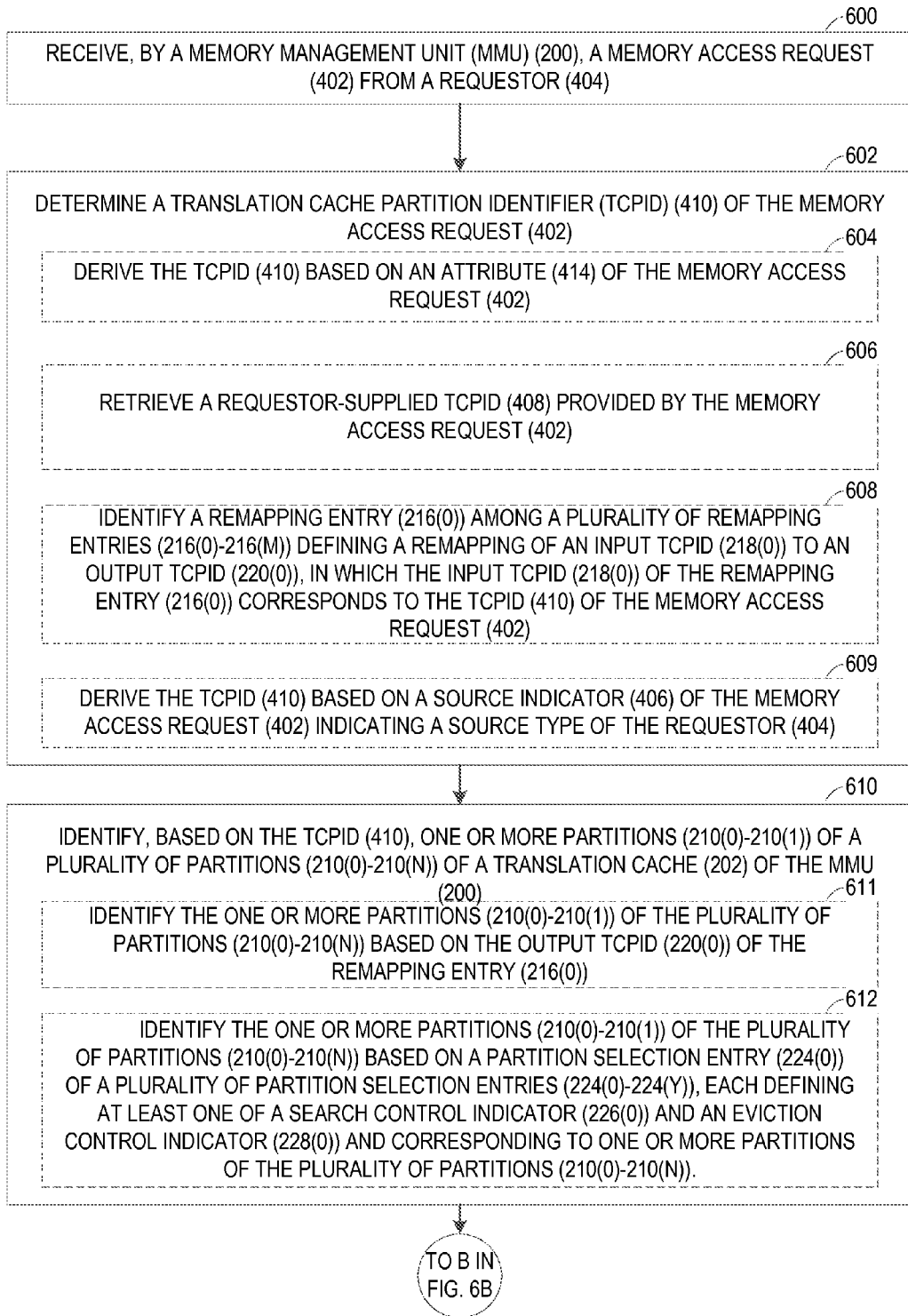
FIGS. 6A-6C are flowcharts illustrating further exemplary operations for providing partitioned translation caches, including TCPID remapping and use of partition selection entries.
Figure 6B:
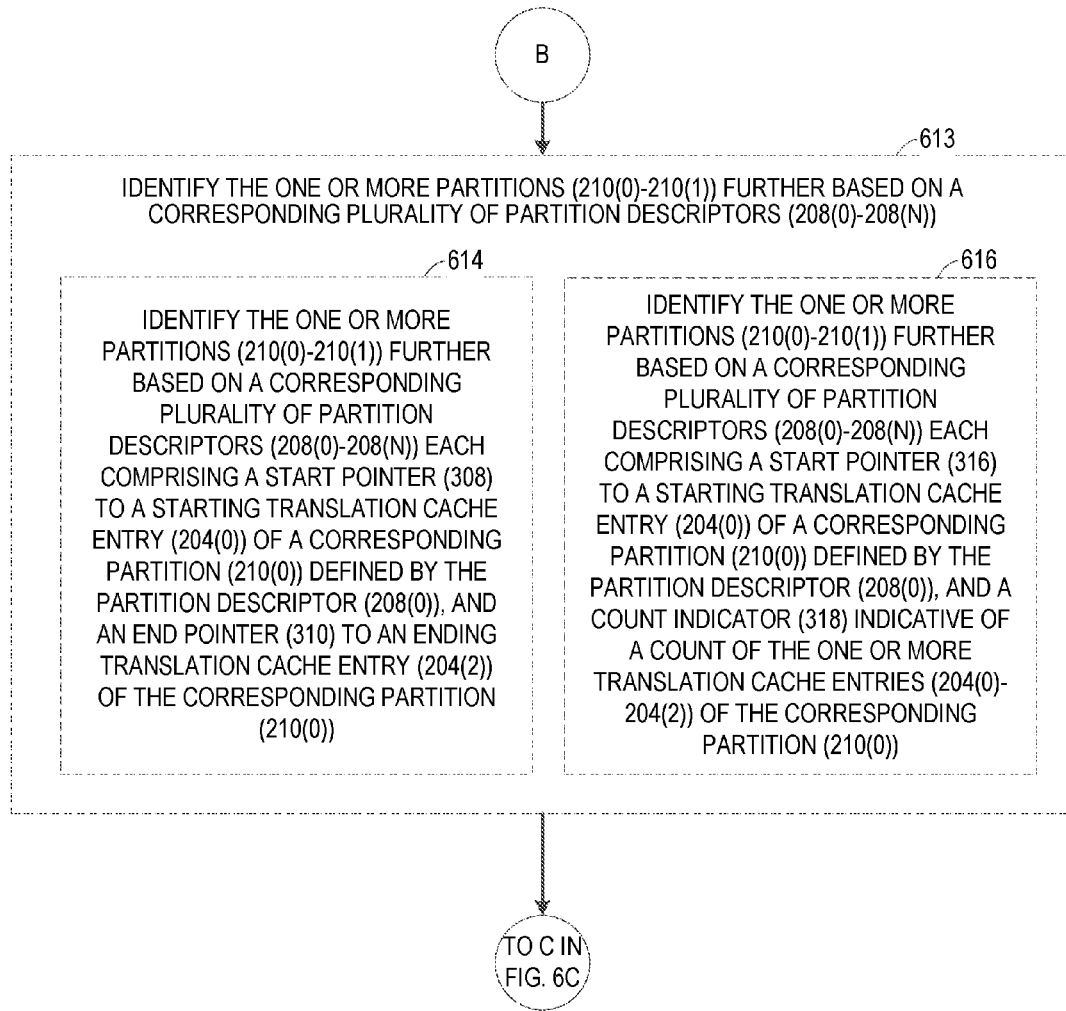
Figure 6C:
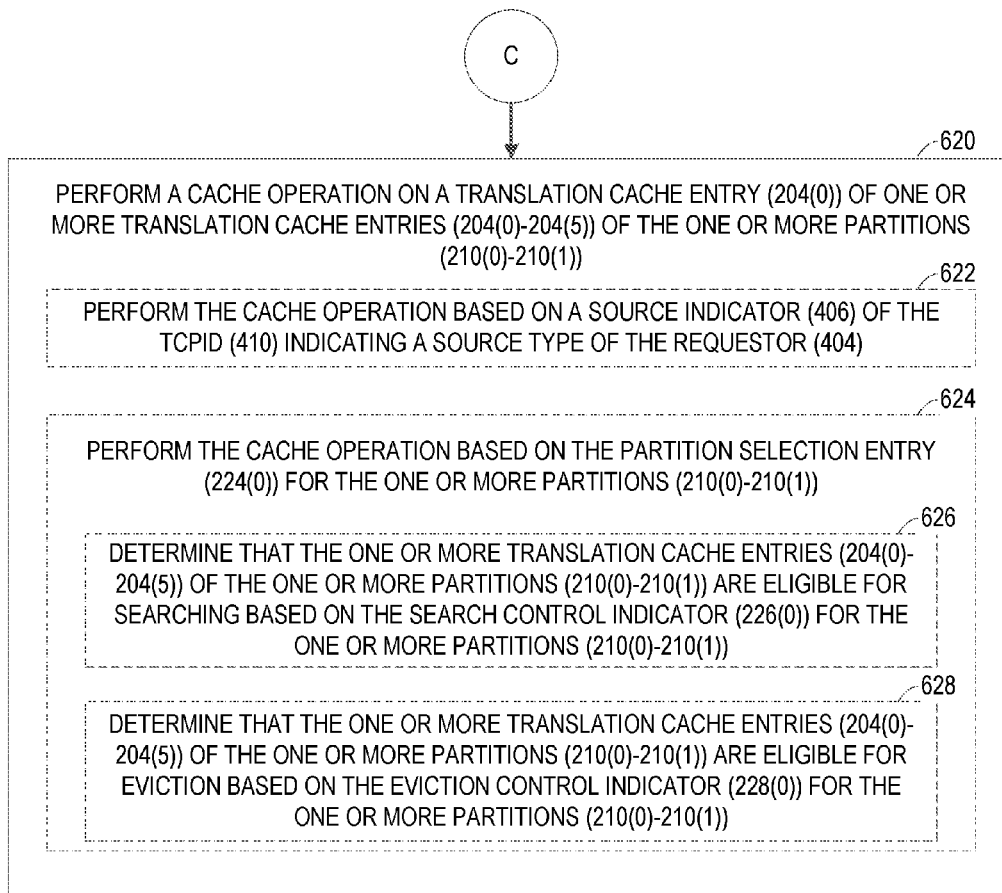

FIGS. 6A-6C are flowcharts illustrating further exemplary operations for providing partitioned translation caches. In particular, FIG. 6A includes operations of the partition translation circuit 212 for TCPID remapping, while FIG. 6B provides operations of the partition translation circuit 212 for using exemplary partition definition mechanisms. FIG. 6C illustrates operations of the partition translation circuit 212 for employing partition selection entries in performing a cache operation. Elements in FIGS. 2-4 are referenced in describing FIGS. 6A-6C for the sake of brevity.

In FIG. 6A, operations begin with the MMU 200 (in particular, the partition translation circuit 212) receiving the memory access request 402 from the requestor 404 (block 600). The partition translation circuit 212 next determines a TCPID 410 of the memory access request 402 (block 602). Some aspects may provide that the operations of block 602 for determining the TCPID 410 may comprise deriving the TCPID 410 based on an attribute 414 of the memory access request 402 (block 604). In some aspects, the operations of block 602 for determining the TCPID 410 may include retrieving a requestor-supplied TCPID 408 provided by the memory access request 402 (block 606). According to some aspects, the operations of block 602 for determining the TCPID 410 may comprise identifying a remapping entry, such as the remapping entry 216(0), among a plurality of remapping entries 216(0)-216(M) defining a remapping of an input TCPID 218(0) to an output TCPID 220(0), in which the input TCPID 218(0) of the remapping entry 216(0) corresponds to the TCPID 410 of the memory access request 402 (block 608). In some aspects, the operations of block 602 for determining the TCPID 410 may comprise deriving the TCPID 410 based on a source indicator 406 of the memory access request 402 indicating a source type of the requestor 404 (block 609).

The partition translation circuit 212 next identifies one or more partitions, such as the partitions 210(0)-210(1), of a plurality of partitions 210(0)-210(N) of a translation cache 202 of the MMU 200 based on the TCPID 410 (block 610). In some aspects, the operations of block 610 for identifying the partitions 210(0)-210(1) may be based on the output TCPID 220(0) of the remapping entry 216(0) (block 611). Some aspects may also provide that the operations of block 610 for identifying the one or more partitions 210(0)-210(1) may be based on a partition selection entry such as the partition selection entry 224(0) of the plurality of partition selection entries 224(0)-224(Y) (block 612). Each of the partition selection entries 224(0)-224(Y) may define at least one of a search control indicator 226(0) and an eviction control indicator 228(0), and may correspond to the one or more partitions 210(0)-210(1) of the plurality of partitions 210(0)-210(N), as a non-limiting example. In some aspects, the partition selection entry 224(0) may be selected based on an output TCPID such as the output TCPID 220(0), as a non-limiting example. Processing may then resume at block 613 of FIG. 6B.

Referring now to FIG. 6B, the partition translation circuit 212, according to some aspects, may identify the one or more partitions 210(0)-210(1) further based on a corresponding plurality of partition descriptors 208(0)-208(N) (block 613). According to some aspects, each of the plurality of partition descriptors 208(0)-208(N) may comprise a start pointer, such as the start pointer 308, to a starting translation cache entry 204(0) of a corresponding partition 210(0) defined by the partition descriptor 208(0), and an end pointer, such as the end pointer 310, to an ending translation cache entry 204(2) of the corresponding partition 210(0) (block 614). In other aspects, each of the partition descriptors 208(0)-208(N) may comprise a start pointer, such as the start pointer 316, to a starting translation cache entry 204(0) of a corresponding partition 210(0) defined by the partition descriptor 208(0), and a count indicator, such as the count indicator 318, indicative of a count of the one or more translation cache entries 204(0)-204(2) of the corresponding partition 210(0) (block 616). Processing then resumes at block 620 of FIG. 6C.

Turning now to FIG. 6C, the partition translation circuit 212 next performs a cache operation on a translation cache entry 204(0) of one or more translation cache entries 204(0)-204(5) of the one or more partitions 210(0)-210(1) (block 620). In some aspects, the operations of block 620 for performing the cache operation may be based on the source indicator 406 of the TCPID 410 indicating a source type of the requestor 404 (block 622). Some aspects may provide that the operations of block 620 for performing the cache operation may be based on the partition selection entry 224(0) for the one or more partitions 210(0)-210(1) (block 624). The operations of block 624 for performing the cache operation based on the partition selection entry 224(0) may include, in some aspects, determining that the one or more translation cache entries 204(0)-204(5) of the one or more partitions 210(0)-210(1) are eligible for searching based on the search control indicator 226(0) for the one or more partitions 210(0)-210(1) (block 626). The operations of block 624 for performing the cache operation based on the partition selection entry 224(0) according to some aspects may include determining that the one or more translation cache entries 204(2) 204(0)-204(5) of the one or more partitions 210(0)-210(1) are eligible for eviction based on the eviction control indicator 228(0) for the one or more partitions 210(0)-210(1) (block 628).

Providing MMU partitioned translation caches, and related apparatuses, methods, and computer-readable media, according to aspects disclosed herein may be provided in or integrated into any processor-based device. Examples, without limitation, include a set top box, an entertainment unit, a navigation device, a communications device, a fixed location data unit, a mobile location data unit, a mobile phone, a cellular phone, a computer, a portable computer, a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, and a portable digital video player.

Figure 7:
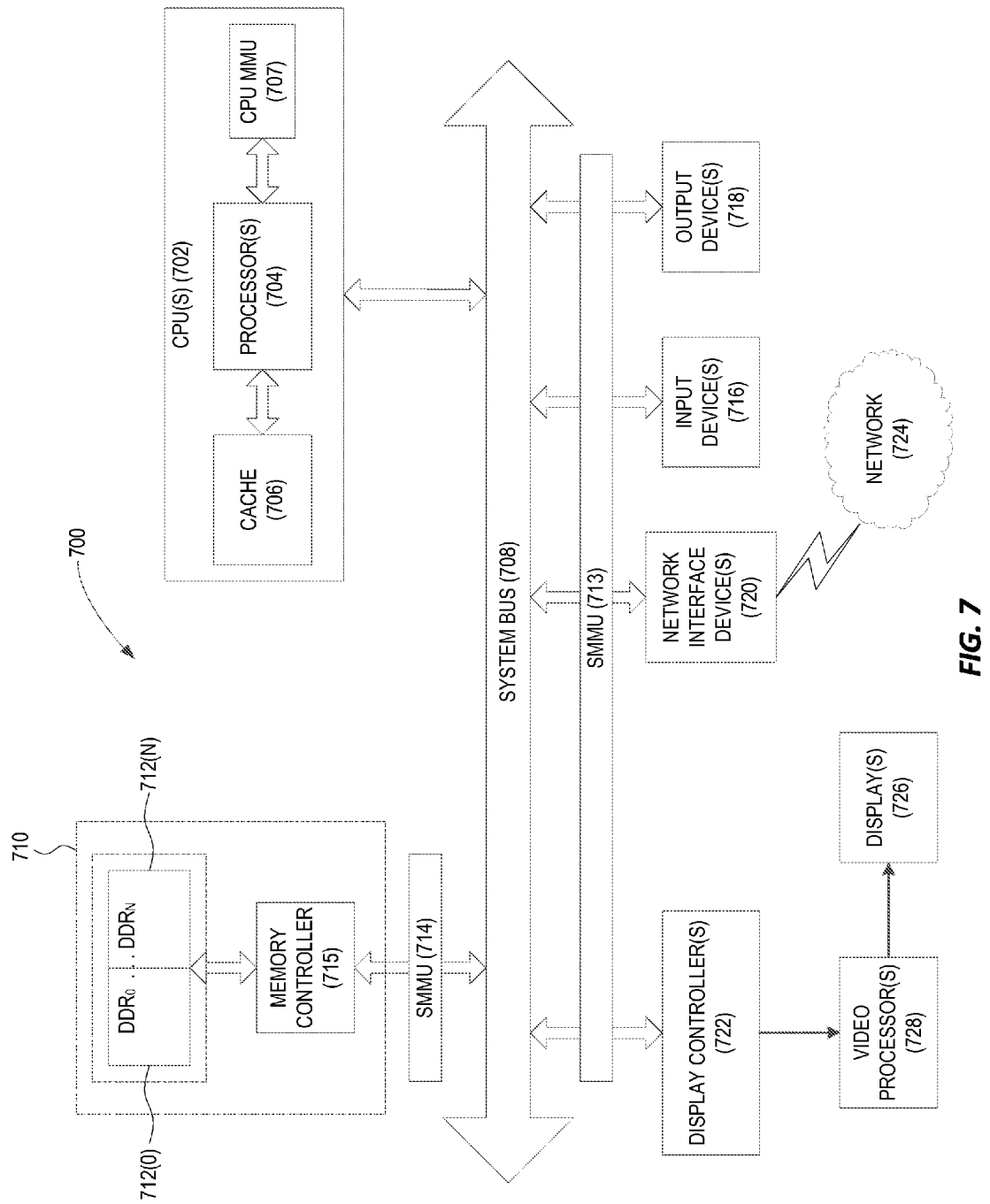
FIG. 7 is a block diagram of an exemplary processor-based system that can include the MMU of FIG. 1.

In this regard, FIG. 7 illustrates an example of a processor-based system 700 that may employ the MMU 200 illustrated in FIG. 2. In this example, the processor-based system 700 includes one or more central processing units (CPUs) 702, each including one or more processors 704. The CPU(s) 702 may have cache memory 706 coupled to the processor(s) 704 for rapid access to temporarily stored data. The CPU(s) 702 further includes a CPU MMU 707 for providing address translation services for CPU memory access requests. The CPU(s) 702 is coupled to a system bus 708 and can intercouple master and slave devices included in the processor-based system 700. As is well known, the CPU(s) 702 communicates with these other devices by exchanging address, control, and data information over the system bus 708. For example, the CPU(s) 702 can communicate bus transaction requests to a memory system 710, which provides memory units 712(0)-712(N). In the example of FIG. 7, SMMUs 713 and 714 are also coupled to the system bus 708. It is to be understood that one or more of the CPU MMU 707 and the SMMUs 713 and 714 may comprise the MMU 200 of FIG. 2. It is to be further understood that the processor-based system 700 may include multiple SMMUs 713 and 714.

Other master and slave devices can be connected to the system bus 708 via the SMMUs 713 and 714. As illustrated in FIG. 7, these devices can include a memory controller 715, one or more input devices 716, one or more output devices 718, one or more network interface devices 720, and one or more display controllers 722, as examples. The input device(s) 716 can include any type of input device, including but not limited to input keys, switches, voice processors, etc. The output device(s) 718 can include any type of output device, including but not limited to audio, video, other visual indicators, etc. The network interface device(s) 720 can be any devices configured to allow exchange of data to and from a network 724. The network 724 can be any type of network, including but not limited to a wired or wireless network, a private or public network, a local area network (LAN), a wide local area network (WLAN), and the Internet. The network interface device(s) 720 can be configured to support any type of communications protocol desired.

The CPU(s) 702 may also be configured to access the display controller(s) 722 over the system bus 708 to control information sent to one or more displays 726. The display controller(s) 722 sends information to the display(s) 726 to be displayed via one or more video processors 728, which process the information to be displayed into a format suitable for the display(s) 726. The display(s) 726 can include any type of display, including but not limited to a cathode ray tube (CRT), a liquid crystal display (LCD), a plasma display, etc.

Those of skill in the art will further appreciate that the various illustrative logical blocks, modules, circuits, and algorithms described in connection with the aspects disclosed herein may be implemented as electronic hardware, instructions stored in memory or in another computer-readable medium and executed by a processor or other processing device, or combinations of both. The master and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer-readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flow chart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but is to be accorded the widest scope consistent with the principles and novel features disclosed herein.

What is claimed is:

1. An apparatus comprising a memory management unit (MMU) for providing partitioned translation caches, comprising:
    a translation cache configured to provide a plurality of translation cache entries each defining an address translation mapping;

a partition descriptor table configured to provide a plurality of partition descriptors defining a corresponding plurality of partitions of the translation cache, each partition of the plurality of partitions comprising one or more translation cache entries of the plurality of translation cache entries; and a partition translation circuit configured to:
  receive a memory access request from a requestor;
  determine a translation cache partition identifier (TCPID) of the memory access request;
  identify one or more partitions of the plurality of partitions based on the TCPID; and
  perform a cache operation on a translation cache entry of the one or more translation cache entries of the one or more partitions.

2. The apparatus of claim 1, wherein the partition descriptor table is configured to provide the plurality of partition descriptors each comprising:
  a start pointer to a starting translation cache entry of a corresponding partition defined by the partition descriptor; and
  an end pointer to an ending translation cache entry of the corresponding partition.

3. The apparatus of claim 1, wherein the partition descriptor table is configured to provide the plurality of partition descriptors each comprising:
  a start pointer to a starting translation cache entry of a corresponding partition defined by the partition descriptor; and
  a count indicator indicative of a count of the one or more translation cache entries of the corresponding partition.

4. The apparatus of claim 1, wherein the partition translation circuit is configured to determine the TCPID by deriving the TCPID based on an attribute of the memory access request.

5. The apparatus of claim 1, wherein the partition translation circuit is configured to determine the TCPID by retrieving a requestor-supplied TCPID provided by the memory access request.

6. The apparatus of claim 1, further comprising a partition remapping table configured to provide a plurality of remapping entries each defining a remapping of an input TCPID to an output TCPID;
  wherein the partition translation circuit is configured to:
    determine the TCPID by identifying a remapping entry of the plurality of remapping entries, in which the input TCPID of the remapping entry corresponds to the TCPID of the memory access request; and
    identify the one or more partitions of the plurality of partitions based on the output TCPID of the remapping entry.

7. The apparatus of claim 1, wherein:
  the memory access request comprises a source indicator indicating a source type of the requestor; and
  the partition translation circuit is configured to determine the TCPID by deriving the TCPID based on the source indicator.

8. The apparatus of claim 1, further comprising a partition selection table comprising a plurality of partition selection entries, each defining at least one of a search control indicator and an eviction control indicator, and each corresponding to one or more partitions of the plurality of partitions; and
  wherein the partition translation circuit is configured to identify the one or more partitions of the plurality of partitions based on a partition selection entry of the plurality of partition selection entries.

9. The apparatus of claim 8, wherein the partition translation circuit is configured to perform the cache operation by determining that the one or more translation cache entries of the one or more partitions are eligible for searching based on the search control indicator of the partition selection entry for the one or more partitions.

10. The apparatus of claim 8, wherein the partition translation circuit is configured to perform the cache operation by determining that the one or more translation cache entries of the one or more partitions are eligible for eviction based on the eviction control indicator of the partition selection entry for the one or more partitions.

11. The apparatus of claim 1 integrated into an integrated circuit (IC).

12. The apparatus of claim 1 integrated into a device selected from a group consisting of a set top box, an entertainment unit, a navigation device, a communications device, a fixed location data unit, a mobile location data unit, a mobile phone, a cellular phone, a computer, a personal digital assistant (PDA), a monitor, a computer monitor, a television, a tuner, a radio, a music player, and a video player.

13. A memory management unit (MMU) comprising:
  a means for providing a plurality of translation cache entries each defining an address translation mapping;
  a means for providing a plurality of partition descriptors defining a corresponding plurality of partitions of a translation cache of the MMU, each partition of the plurality of partitions comprising one or more translation cache entries of the plurality of translation cache entries;
  a means for receiving a memory access request from a requestor;
  a means for determining a translation cache partition identifier (TCPID) of the memory access request;
  a means for identifying one or more partitions of the plurality of partitions based on the TCPID; and
  a means for performing a cache operation on a translation cache entry of the one or more translation cache entries of the one or more partitions.

14. A method for providing partitioned translation caches, comprising:
  receiving, by a memory management unit (MMU), a memory access request from a requestor;
  determining a translation cache partition identifier (TCPID) of the memory access request;
  identifying, based on the TCPID, one or more partitions of a plurality of partitions of a translation cache of the MMU; and
  performing a cache operation on a translation cache entry of one or more translation cache entries of the one or more partitions.

15. The method of claim 14, wherein identifying the one or more partitions of the plurality of partitions is further based on a corresponding plurality of partition descriptors each comprising:
  a start pointer to a starting translation cache entry of a corresponding partition defined by the partition descriptor; and
  an end pointer to an ending translation cache entry of the corresponding partition.

16. The method of claim 14, wherein identifying the one or more partitions of the plurality of partitions is further based on a corresponding plurality of partition descriptors each comprising:

a start pointer to a starting translation cache entry of a corresponding partition defined by the partition descriptor; and a count indicator indicative of a count of the one or more translation cache entries of the corresponding partition.

17. The method of claim 14, wherein determining the TCPID comprises deriving the TCPID based on an attribute of the memory access request.

18. The method of claim 14, wherein determining the TCPID comprises retrieving a requestor-supplied TCPID provided by the memory access request.

19. The method of claim 14, comprising:

determining the TCPID by identifying a remapping entry among a plurality of remapping entries each defining a remapping of an input TCPID to an output TCPID, in which the input TCPID of the remapping entry corresponds to the TCPID of the memory access request; and identifying the one or more partitions of the plurality of partitions based on the output TCPID of the remapping entry.

20. The method of claim 14, wherein:

the memory access request comprises a source indicator indicating a source type of the requestor; and determining the TCPID comprises deriving the TCPID based on the source indicator.

21. The method of claim 14, further comprising identifying the one or more partitions of the plurality of partitions based on a partition selection entry of a plurality of partition selection entries, each defining at least one of a search control indicator and an eviction control indicator and corresponding to one or more partitions of the plurality of partitions.

22. The method of claim 21, wherein performing the cache operation based on the partition selection entry for the one or more partitions comprises determining that the one or more translation cache entries of the one or more partitions are eligible for searching based on the search control indicator of the partition selection entry for the one or more partitions.

23. The method of claim 21, wherein performing the cache operation based on the partition selection entry for the one or more partitions comprises determining that the one or more translation cache entries of the one or more partitions are eligible for eviction based on the eviction control indicator of the partition selection entry for the one or more partitions.

24. A non-transitory computer-readable medium having stored thereon computer-executable instructions which, when executed by a processor, cause the processor to:

receive a memory access request from a requestor;

determine a translation cache partition identifier (TCPID) of the memory access request;

identify, based on the TCPID, one or more partitions of a plurality of partitions of a translation cache of a memory management unit (MMU); and perform a cache operation on a translation cache entry of one or more translation cache entries of the one or more partitions.

25. The non-transitory computer-readable medium of claim 24 having stored thereon computer-executable instructions which, when executed by the processor, further cause the processor to identify the one or more partitions of the plurality of partitions based a corresponding plurality of partition descriptors each comprising:

a start pointer to a starting translation cache entry of a corresponding partition defined by the partition descriptor; and an end pointer to an ending translation cache entry of the corresponding partition.

26. The non-transitory computer-readable medium of claim 24 having stored thereon computer-executable instructions which, when executed by the processor, further cause the processor to identify the one or more partitions of the plurality of partitions based a corresponding plurality of partition descriptors each comprising:

a start pointer to a starting translation cache entry of a corresponding partition defined by the partition descriptor; and a count indicator indicative of a count of the one or more translation cache entries of the corresponding partition.

27. The non-transitory computer-readable medium of claim 24 having stored thereon computer-executable instructions which, when executed by the processor, further cause the processor to determine the TCPID by deriving the TCPID based on an attribute of the memory access request.

28. The non-transitory computer-readable medium of claim 24 having stored thereon computer-executable instructions which, when executed by the processor, further cause the processor to determine the TCPID by retrieving a requestor-supplied TCPID provided by the memory access request.

29. The non-transitory computer-readable medium of claim 24 having stored thereon computer-executable instructions which, when executed by the processor, further cause the processor to:

determine the TCPID by identifying a remapping entry among a plurality of remapping entries each defining a remapping of an input TCPID to an output TCPID, in which the input TCPID of the remapping entry corresponds to the TCPID of the memory access request; and identify the one or more partitions of the plurality of partitions based on the output TCPID of the remapping entry.

30. The non-transitory computer-readable medium of claim 24 having stored thereon computer-executable instructions which, when executed by the processor, further cause the processor to determine the TCPID by deriving the TCPID based on a source indicator of the memory access request indicating a source type of the requestor.

31. The non-transitory computer-readable medium of claim 24 having stored thereon computer-executable instructions which, when executed by the processor, further cause the processor to identify the one or more partitions of the plurality of partitions based on a partition selection entry of a plurality of partition selection entries, each defining at least one of a search control indicator and an eviction control indicator and corresponding to one or more partitions of the plurality of partitions.

32. The non-transitory computer-readable medium of claim 31 having stored thereon computer-executable instructions which, when executed by the processor, further cause the processor to perform the cache operation based on the partition selection entry for the one or more partitions by determining that the one or more translation cache entries of the one or more partitions are eligible for searching based on the search control indicator of the partition selection entry for the one or more partitions.

33. The non-transitory computer-readable medium of claim 31 having stored thereon computer-executable instructions which, when executed by the processor, further cause the processor to perform the cache operation based on the partition selection entry for the one or more partitions by determining that the one or more translation cache entries of the one or more partitions are eligible for eviction based on the eviction control indicator of the partition selection entry for the one or more partitions.

\* \* \* \* \*